(12) United States Patent
More et al.

(10) Patent No.: US 12,541,629 B2
(45) Date of Patent: Feb. 3, 2026

(54) GRAPH REPRESENTATION OF A CIRCUIT SIMULATION WAVEFORM

(71) Applicant: Synopsys, Inc., Mountain View, CA (US)

(72) Inventors: Geetesh More, Fredericton (CA); Zeng Cheng, Ottawa (CA)

(73) Assignee: Synopsys, Inc., Sunnyvale, CA (US)

( * ) Notice: Subject to any disclaimer, the term of this patent is extended or adjusted under 35 U.S.C. 154(b) by 708 days.

(21) Appl. No.: 17/955,117

(22) Filed: Sep. 28, 2022

(65) Prior Publication Data
US 2024/0104278 A1    Mar. 28, 2024

(51) Int. Cl.
*G06F 30/3308* (2020.01)

(52) U.S. Cl.
CPC ................. *G06F 30/3308* (2020.01)

(58) Field of Classification Search
USPC ........................................ 716/106
See application file for complete search history.

(56) References Cited

U.S. PATENT DOCUMENTS

2006/0229828 A1\* 10/2006 Hathaway ............. G06F 30/367
702/57

\* cited by examiner

*Primary Examiner* — Bryce M Aisaka
(74) *Attorney, Agent, or Firm* — Patterson + Sheridan, LLP (57) ABSTRACT

A system and method for analyzes a circuit design by obtaining a circuit simulation waveform of a circuit design. The circuit simulation waveform has signals associated with one or more of a read transaction and a write transaction of the circuit design. Further a first graph representation is created from a first signal of the signals of the circuit simulation waveform. The first graph representation includes a first node corresponding to an edge of the first signal. A first simulation property of the circuit design is determined from the first graph representation, and the first simulation property is output.

20 Claims, 10 Drawing Sheets

GRAPH REPRESENTATION OF A CIRCUIT SIMULATION WAVEFORM

TECHNICAL FIELD

The present disclosure relates to analyzing a circuit design, and more particularly to using the signals generated by a simulation of a circuit design to detect errors within the circuit design.

BACKGROUND

Circuit designs are analyzed to ensure that the timing constraints of the corresponding communication interface protocols are met and to detect other errors within a circuit design. Analyzing a circuit design includes simulating a circuit design to generate a simulation waveform having signals, and using the signals of the simulation waveform to debug a circuit design. Debugging the circuit design identifies errors within the circuit design. A simulation waveform may include multiple signals, each of which are analyzed and compared against a specification of a corresponding communication interface to debug the circuit design. Errors detected during the debugging process are output to a user, or administrator, for a corrective, or other action.

SUMMARY

In one example, a method includes obtaining a circuit simulation waveform of a circuit design. The circuit simulation waveform has signals associated with one or more of a read transaction and a write transaction of the circuit design. The method further includes creating a first graph representation from a first signal of the signals of the circuit simulation waveform. The first graph representation includes a first node corresponding to an edge of the first signal. Further, the method includes determining, via a processing device, a first simulation property of the circuit design from the first graph representation, and outputting the first simulation property.

In one example, a system includes a memory storing instructions, and a processor. The processor is coupled with the memory to execute the instructions. The instructions when executed cause the processor to obtain a circuit simulation waveform of a circuit design. The circuit simulation waveform including signals associated with one or more of a read transaction and a write transaction of the circuit design. Further, the processor creates a first graph representation from a first signal of the signals of the circuit simulation waveform. The first graph representation including a first node corresponding to the first signal. The processor further determines a first simulation property of the circuit design from the first graph representation, and outputs the first simulation property.

In one example, a non-transitory computer readable medium comprising stored instructions, which when executed by a processor, cause the processor to obtain a circuit simulation waveform of a circuit design. The circuit simulation waveform including signals associated with one or more of a read transaction and a write transaction of the circuit design. Further, the processor detects a first signal of the signals and a second signal of the signals. The processor further displays, within a graphical user interface, a first graph representation including a first node and a second node. The first node is generated based on the first signal and the second node is generated based on the second signal.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a graph representation of a circuit simulation waveform. Debugging a circuit design includes simulating the circuit design to generate a circuit simulation waveform, and analyzing the signals of the circuit simulation waveform to detect errors within the functionality of the circuit design. The errors may correspond to an incorrect operating frequency, latencies that exceed the design limitations, and/or lack of a response signal, among others. In one example, the errors are compared to a specification of a communication interface protocol associated with the circuit design to determine whether or not errors are present within the operation of the circuit design.

A circuit simulation waveform may include multiple signals having various voltage transitions (e.g., rising and/or falling edges) associated with corresponding timestamps. Due to the large number of signals and voltage transitions, in many instances, the debugging process is time consuming and error prone. The debugging process as described herein includes generating a graph (e.g., forest) representation from the signals of a circuit simulation waveform. The graph representation includes nodes connected by branches (paths or links). The nodes represent signals within the circuit simulation waveform, and the value of the node corresponds to whether or not a signal is asserted or deasserted. Further, branches link the signals of the circuit simulation waveform with each other, and the value of the branches corresponds to a determined latency between the signals, or nodes. The graph representation is used to determine simulation properties (e.g., timing information, latency information, and signal acknowledgement information, among others), which is used in debugging the corresponding circuit design.

Technical advantages of the present disclosure include, but are not limited to, generating a graph representation from a circuit simulation waveform, and using the presence and values of the nodes and interconnecting branches to determine simulation properties, which are used to debug a circuit design. Further, the debugging process described herein allows for the parallel debugging of multiple waveforms. For example, using the debugging process as described here allows for multiple waveforms to be debugged during at least partially overlapping periods of time. The debugging process described herein further allows for timing related simulation issues to be resolved in less time as compared to other debugging processes. In various instances, the debugging process described herein allows for more complex circuit designs to be debugged in less time using less processing resources as compared to other debugging processes. The debugging process as described herein uses less processing resources, and processing time, allowing for more circuit designs to be simulated in a given time, decreasing the manufacturing cost and time of the corresponding semiconductor devices.

Figure 1:
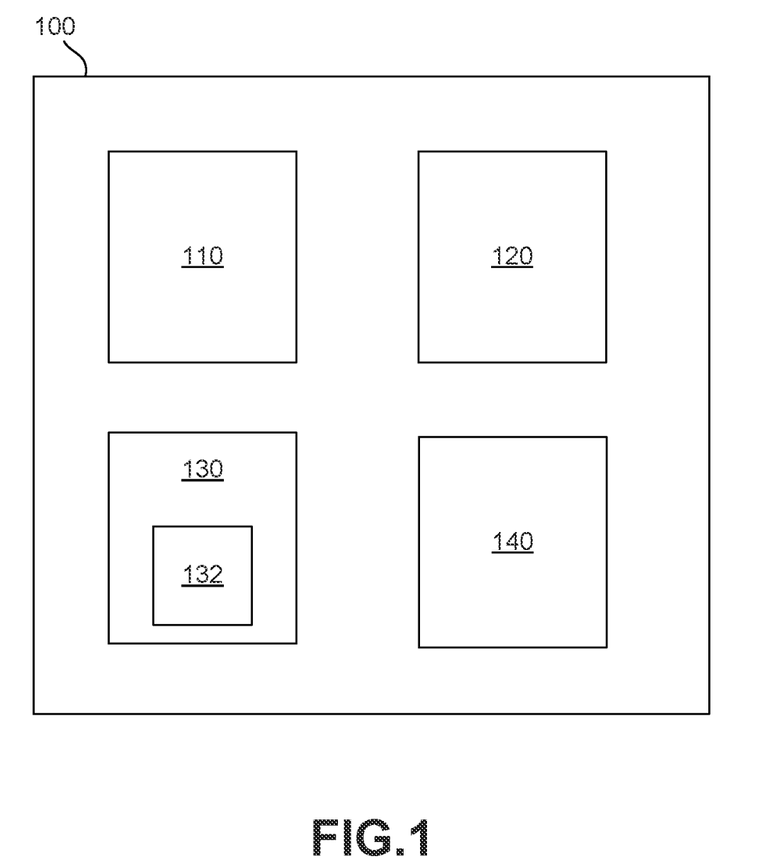
FIG. 1 illustrates a block diagram of a circuit design system, according to one or more examples.

FIG. 1 illustrates a block diagram of a circuit design system 100, according to one or more examples. The circuit design system 100 is an electronic design automation (EDA) tool. The circuit design system 100 includes one or more processors (e.g., processing devices 1102 of FIG. 11), that executes instructions (e.g., instructions 1126 of FIG. 11) stored in a memory (e.g., the memory 130, main memory 1104 of FIG. 11 and/or the machine-readable storage medium 1124 of FIG. 11) to analyze a circuit simulation waveform (e.g., circuit simulation waveform 132) of a circuit design to debug the circuit design. For example, the circuit design system 100 determines a graph (e.g., forest) representation for a signal or signals of the circuit simulation waveform, and generates a report that can be used to identify one or more errors (or faults) within the circuit design based on the graph representation. A graph representation includes nodes that are interconnected via branches. The values (e.g., weights) of the nodes and branches may be used to relate information related to the signals of the circuit simulation waveform. In one example, each node corresponds to a signal of a circuit simulation waveform, and the branch corresponds to associated signals. In one example, the circuit design system 100 identifies the one or more errors within the circuit design based on the graph representation.

As illustrated in FIG. 1, the circuit design system 100 includes a graph generation engine 110, a property engine 120, and a memory 130.

The graph generation engine 110 includes one or more processors (e.g., processing devices 1102 of FIG. 11) that execute instructions (e.g., instructions 1126 of FIG. 11) stored in a memory (e.g., the memory 130, main memory 1104 of FIG. 11 and/or the machine-readable storage medium 1124 of FIG. 11) to generate a graph representation from the circuit simulation waveform 132. The graph generation engine 110 obtains the circuit simulation waveform 132 from the memory 130. In another example, the graph generation engine 110 obtains (e.g., receives) the circuit simulation waveform 132 from another engine within the circuit design system 100 or a system external to and connected to the circuit design system 100.

In one example, the circuit simulation waveform 132 corresponds to that of a double data rate (DDR) memory circuit design, or a low power DDR (LPDDR) memory circuit design, among others.

The property engine 120 includes one or more processors (e.g., processing devices 1102 of FIG. 11) that execute instructions (e.g., instructions 1126 of FIG. 11) stored in a memory (e.g., the memory 130, main memory 1104 of FIG. 11 and/or the machine-readable storage medium 1124 of FIG. 11) to determine one or more simulation properties of a circuit design from the graph representation. For example, the property engine 120 obtains the graph representation from the memory 130, the graph generation engine 110, another engine within the circuit design system 100, and/or a system external to and connected to the circuit design system 100. Further, the property engine 120 determines the simulation properties as described in the following.

Figure 11:
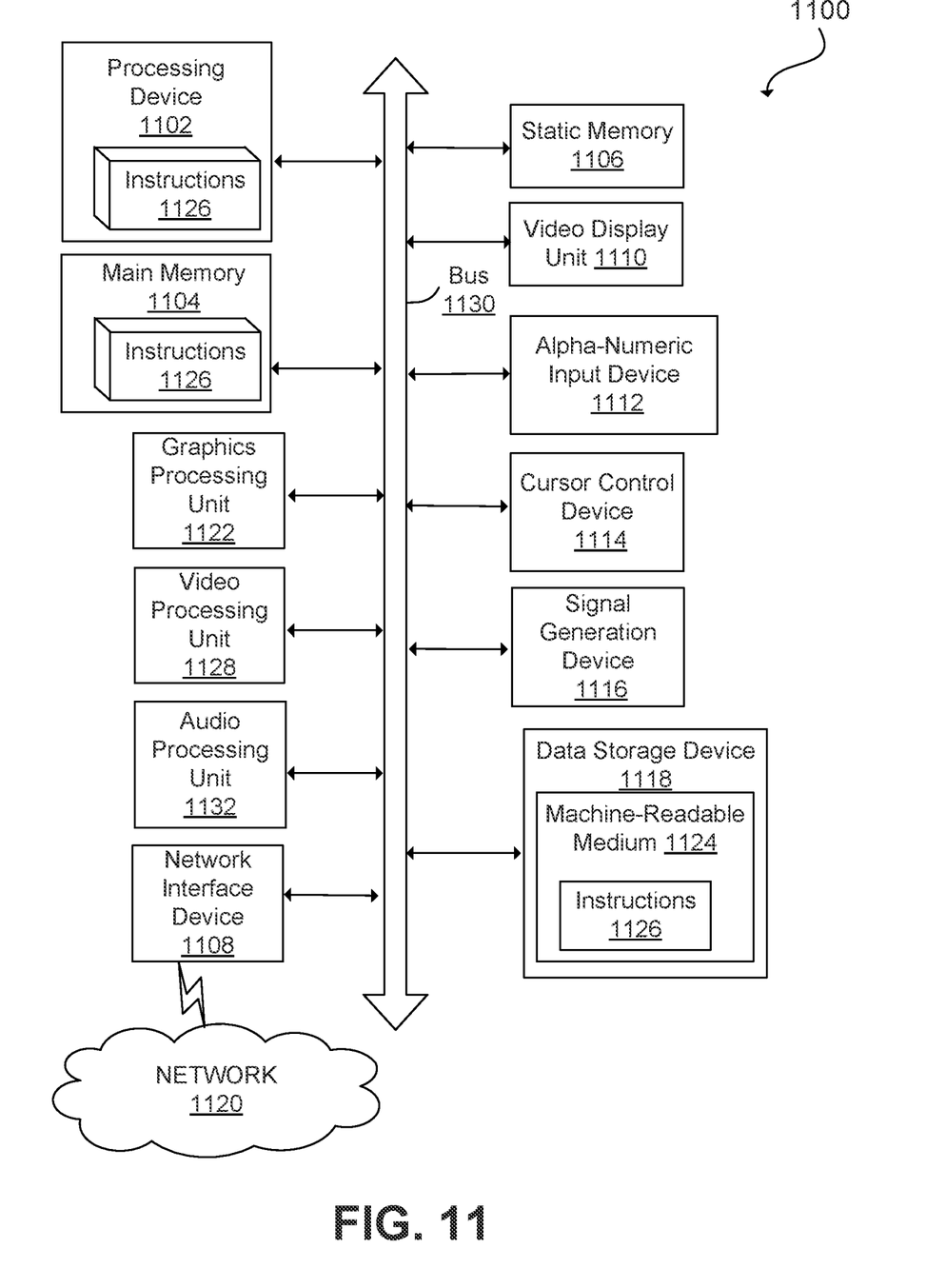
FIG. 11 depicts a diagram of an example computer system in which embodiments of the present disclosure may operate.

The memory 130 may be configured similar to that of the main memory 1104 of FIG. 11 and/or the machine-readable storage medium 1124 of FIG. 11. The memory 130 includes a circuit simulation waveform 132 that is determined by simulating a circuit design and stored within the memory 130. Further, the memory 130 stores graph representations generated by the graph generation engine 110. In one or more examples, the memory 130 stores the simulation properties determined by the property engine 120.

In one or more examples, the circuit design system 100 includes a graphical user interface (GUI) 140. The GUI 140 displays one or more graph representations and/or the corresponding simulation properties. The GUI 140 is displayed within a display device (e.g., the video display unit 1110). In one example, the GUI 140 allows for a user to interact with the displayed graph representations and/or the simulation properties via a user interface device (e.g., the alphanumeric input device 1112 and/or the cursor control device 1114 of FIG. 11).

Figure 2:
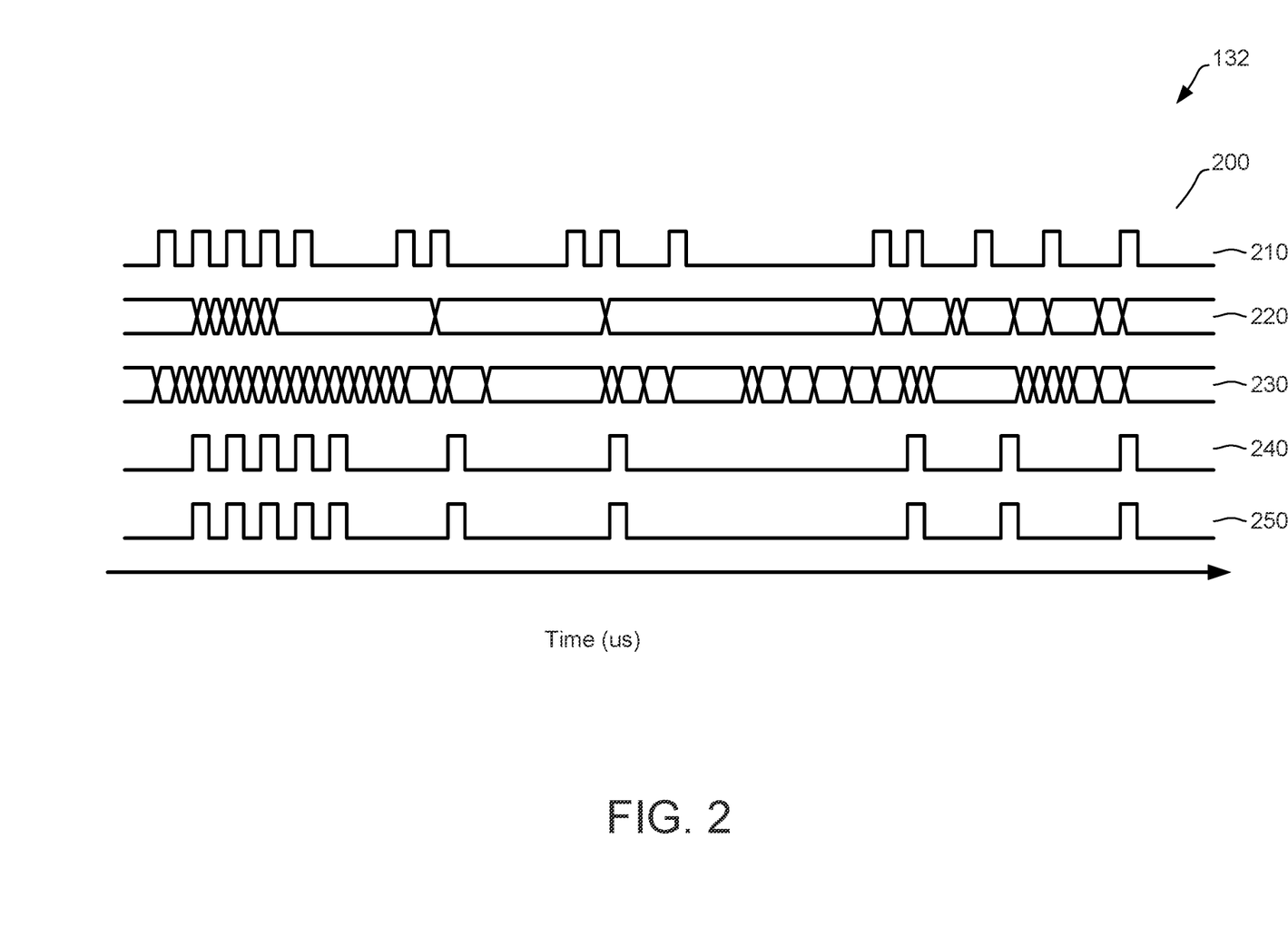
FIG. 2 illustrates signals of a circuit simulation waveform, according to one or more examples.

FIG. 2 illustrates an example of a circuit simulation waveform 132. The circuit simulation waveform 132 includes signals 200 (e.g., signal 210, 220, 230, 240, and 250) associated with transactions (e.g., read transactions and/or write transactions) of the circuit design. The signals 200 correspond to read commands, write commands, chip select signals, refresh commands for a change in power mode, activation commands, data bus signal(s), data strobe signal(s), clock signal(s), and a change in operating frequency, among others, obtained during over a period of time for at different timestamps. While the circuit simulation waveform 132 includes five signals, in other examples, the circuit simulation waveform 132 may include more than or less than five signals.

The circuit simulation waveform 132 is generated during a simulation of a corresponding circuit design, and capturing waveforms of the signals communicated between different portions of the circuit design. The signals are recorded for a period of time. The period of time may include multiple timestamps. At each timestamp, a value of each signal being analyzed is recorded and saved as part of the circuit simulation waveform 132. In one example, the circuit simulation waveform 132 is stored in the memory 130 by a system external, and connected to the circuit design system 100. In one example, the circuit simulation waveform 132 is provided by a user and stored within the memory 130.

Figure 3:
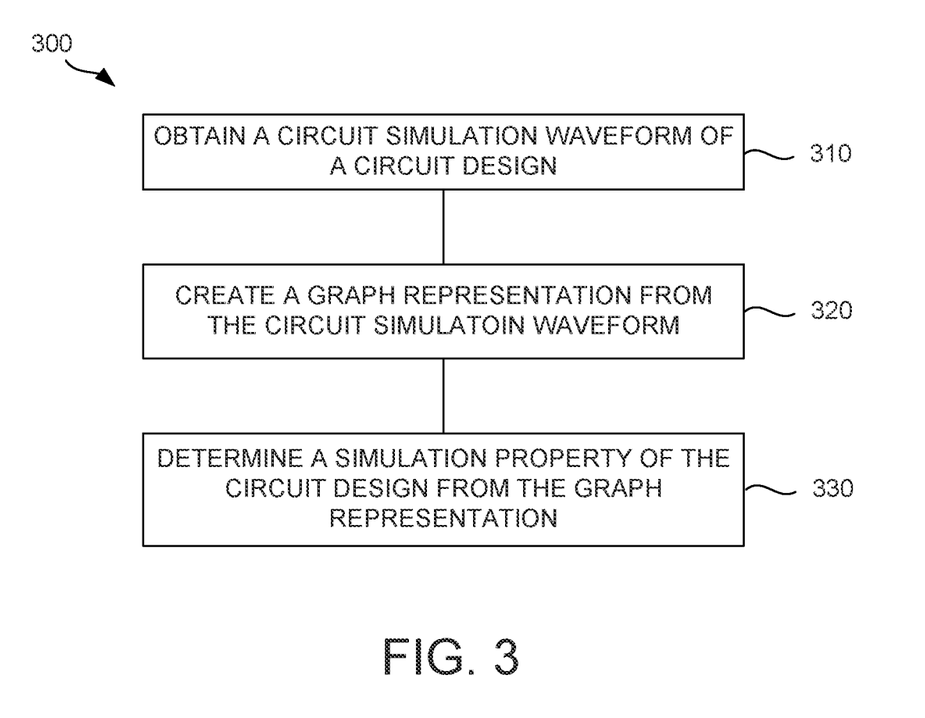
FIG. 3 depicts a flowchart of a method for determining a simulation property from a graph representation of a circuit simulation waveform, according to one or more examples.

FIG. 3 illustrates a flowchart of a method 300 for analyzing circuit design, according to one or more examples. In one example, the method 300 is performed by the circuit design system 100. For example, one or more processors of the circuit design system 100 execute instructions stored within a memory to perform the method 300. The method 300 includes 310, obtaining a circuit simulation waveform of a circuit design. For example, the graph generation engine 110 obtains a circuit simulation waveform (e.g., the circuit simulation waveform 132) from the memory 130. In one example, the graph generation engine 110 obtains the circuit simulation waveform 132 from another engine within the circuit design system 100 and/or a system external to and connected to the circuit design system 100.

At 320 of the method 300, a graph representation is created from the circuit simulation waveform. In one example, the graph generation engine 110 generates a graph representation from the circuit simulation waveform. In one or more examples, the graph representation is displayed within the GUI 140 of FIG. 1. The graph representation may be a forest representation, and includes one or more nodes connected via branch. A forest graph representation may be a directed graph where any two nodes are connected by at most one branch. Further, in one or more examples, a forest graph does not include loops, and has disjointed (e.g., disconnected) nodes. The node corresponds to a rising or falling edge of a signal of the circuit simulation waveform. The weight value of the node corresponds to whether or not the corresponding signal is asserted or deasserted. For example, the weight value of the node is 1 when the corresponding signal is asserted (e.g., a rising edge). In one example, when a signal is deasserted (e.g., a falling edge), the weight value of the associated node remains 1 (e.g., does not change). In one example, a branch connecting the nodes has a weight corresponding to the timing latency (e.g., delta or delay) between the nodes.

Figure 4:
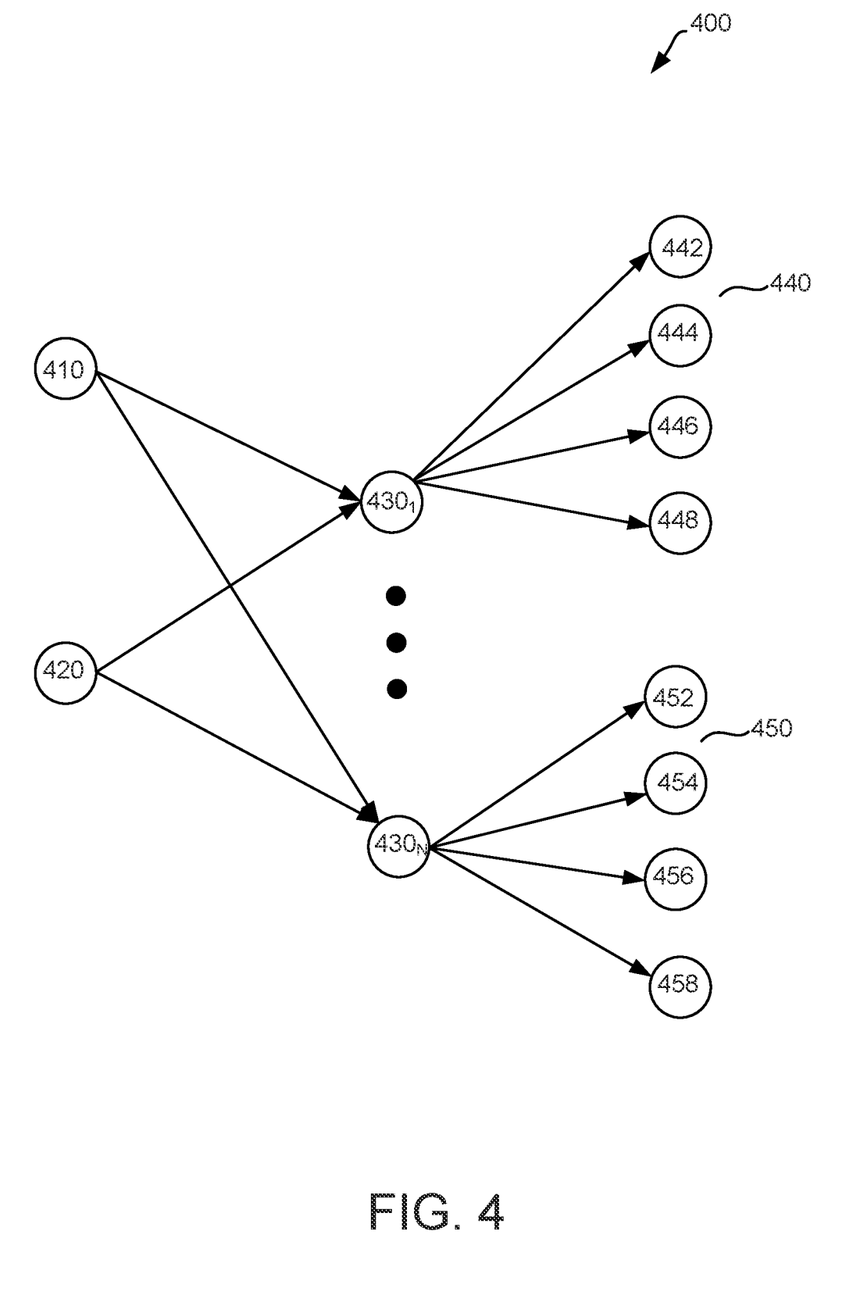
FIG. 4 depicts a graph representation, according to one or more examples.

FIG. 4 illustrates an example graph representation 400, according to one or more examples. In one example, the graph generation engine 110 generates the graph representation 400 from one or more of the signals. In FIG. 4, the graph representation 400 includes nodes 410, 420, 430, 440, and 450. The nodes 410, 420, 430, 440, and 450 correspond to one or more signals of a circuit simulation waveform (e.g., the circuit simulation waveform 500 of FIG. 5). The circuit simulation waveform 500 includes signals 510, 520, 530, 540, 550, and 560. Each of the signals 510, 520, 530, 540, 550, and 560 is captured over a period of time T that includes timestamps T1-T15.

Figure 5:
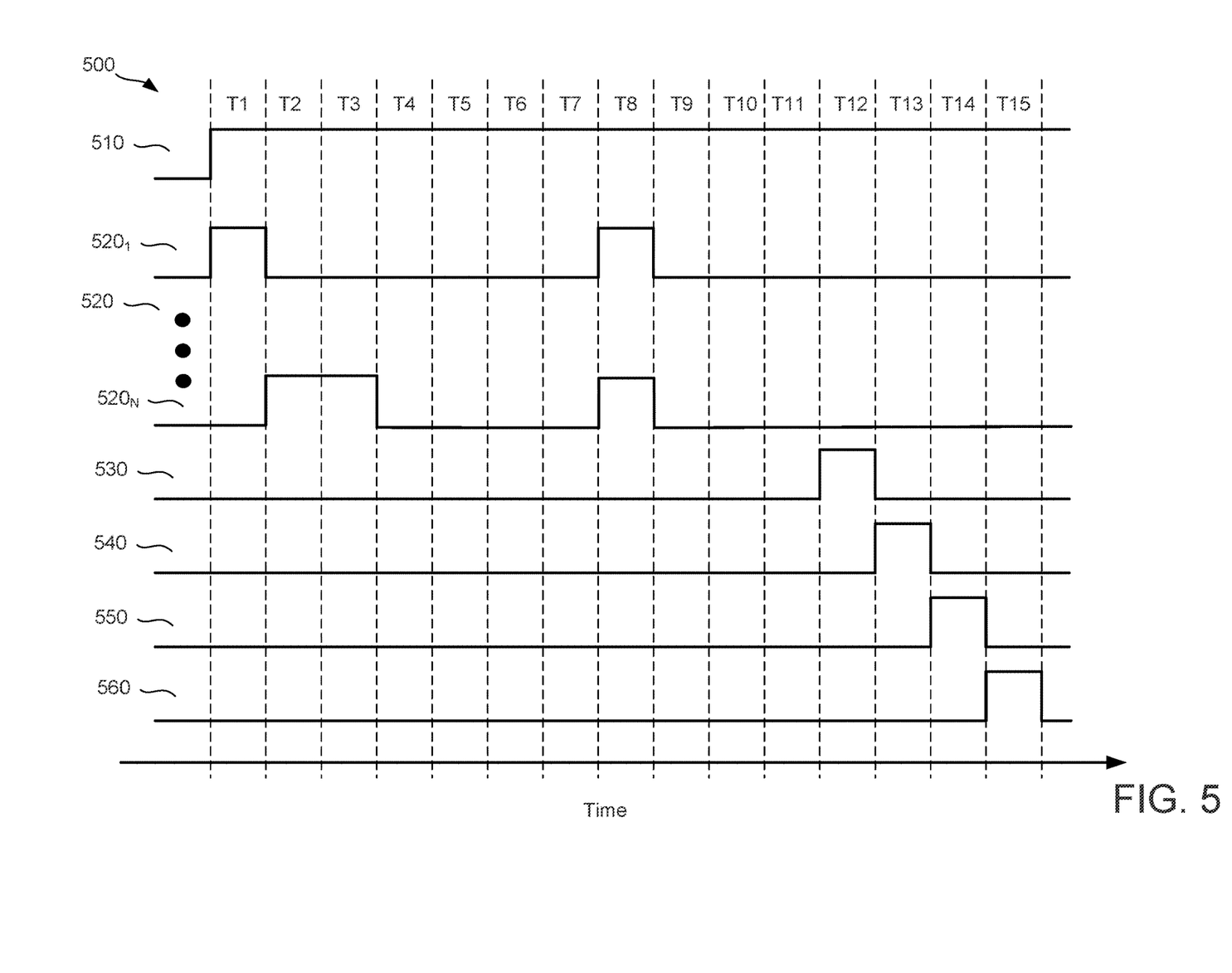
FIG. 5 illustrates signals of a circuit simulation waveform, according to one or more examples.

In one example, the graph generation engine 110 detects the signal (e.g., chip select signal) 510 and the rising edge of the signal 510 and generates the node 410. The graph generation engine 110 generate the node 410 with a weight value of 1 based on the rising (positive) edge of the signal 510 at time T1. The signal 510 remains logic high during times T2-T15. As each of the nodes 430 are dependent on the signal 510, the node 410 is connected with each of the nodes 430 via a respective branch.

In one example, the graph generation engine 110 detects the rising edge of the signals 520, and generates the nodes 420-430. The node 420 is the mission node, and indicates the start of the corresponding computation. In one example, the signals 520 (e.g., signal $520_1$-$520_N$) are command signals. In one example, each of the command signals 520 corresponds to a respective one of the nodes 430. In one example, the graph generation engine 110 detects the rising edge of the signal $520_1$ at time T1 and creates the node 420 and $430_1$. Further, based on the rising edge of the signal $520_1$ at time T1, the weight value of the node $430_1$ is set to 1. At time T2, the graph generation engine 110 detects the rising edge of the signal $520_N$. Based on detecting the rising edge of the signal $520_N$, the graph generation engine 110 sets the weight value of the node $430_N$ to 1. In one or more examples, as the nodes 430 are dependent on the signal 510 (e.g., value at node 410), the weight values of the nodes 430 are set to 1 further based on the weight value of the node 410 being set to 1 (e.g., the signal 510 being asserted).

At time T12, the graph generation engine 110 detects the signal 530 and the rising edge of the signal 530. Based on detecting the rising edge of the signal 530, the graph generation engine 110 creates the node 442, and sets the weight value of the node 442 to 1. At time T13, the graph generation engine 110 detects the rising edge of the signal 540. Based on detecting the rising edge of the signal 530, the graph generation engine 110 creates the node 444, and sets the weight value of the node 444 to 1. At time T14, the graph generation engine 110 detects the rising edge of the signal 550. Based on detecting the rising edge of the signal 550, the graph generation engine 110 creates the node 446, and sets the weight value of the node 446 to 1. At time T15, the graph generation engine 110 detects the rising edge of the signal 560. Based on detecting the rising edge of the signal 560, the graph generation engine 110 creates the node 448, and sets the weight value of the node 448 to 1. While in the present disclosure is described with regard to detecting rising edges of signals, in other examples, the detection of falling edges of signals may be used, or a combination of rising and falling edges of the signals. The use of falling and/or negative edges corresponds to the interface protocol type.

In one or more examples, the signals 530, 540, 550, and 560 occur in response to the command signal $520_1$. Accordingly, the nodes 442-448 are linked to the node $430_1$. In one example, the command signal $520_1$ corresponds to a read request for communicating with a memory. The signal 530 corresponds to an activation signal of a bidirectional data line (DQ bus) of a memory. The rising edge of the signal 530 corresponds to an indication that the DQ bus is initialized. The signal 540 corresponds to sampling of the DQ bus (DQS bus). The rising edge of the signal 540 indicates that DQS is initialized. Further, the signal 540 corresponds a write clock signal (WCK). The WCK is provided to the memory. The rising edge of the signal 540 indicates that the WCK has been provided to the memory. Further, the signal 550 corresponds a clock signal (CK). The CK is provided to the memory. The rising edge of the signal 550 indicates that the CK has been provided to the memory.

While not illustrated, the nodes 450 correspond to data communication (e.g., acknowledgement) signals associated with the command signal $520_N$, similar to described above with regard to the node $430_N$ and the nodes 450. Each of the nodes 452, 454, 456, and 458 correspond to a different data communication signal.

Figure 6:
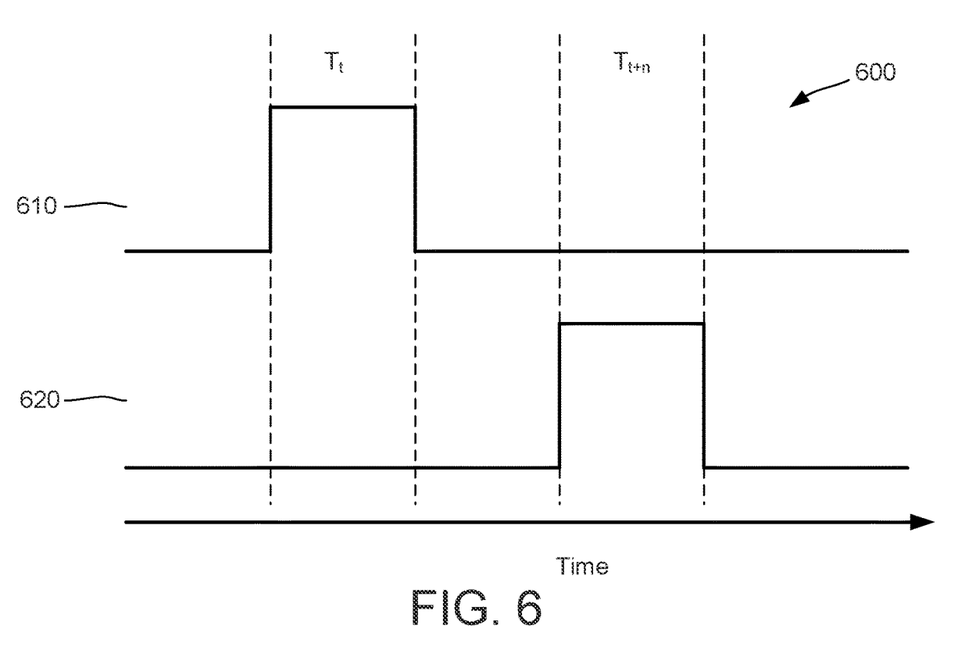
FIG. 6 illustrates signals of a circuit simulation waveform, according to one or more examples.
Figure 7:
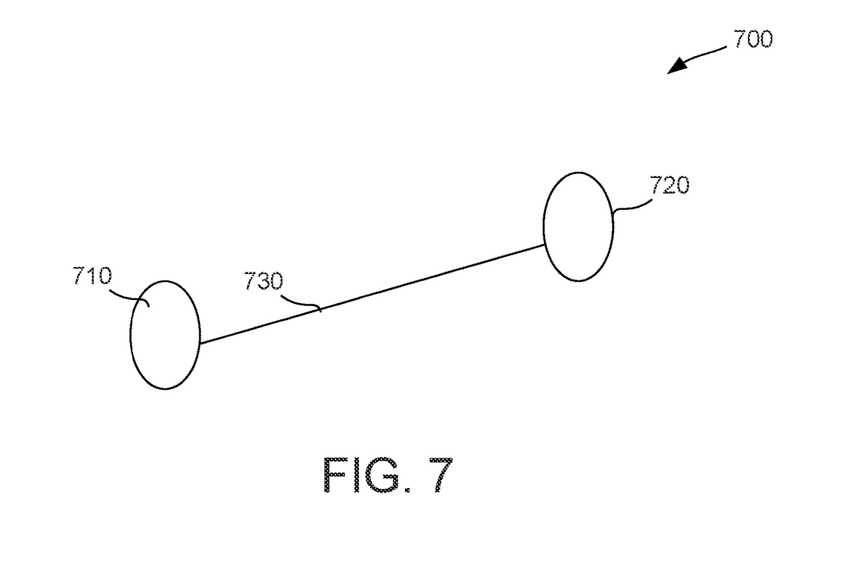
FIG. 7 depicts a graph representation of the circuit simulation waveform of FIG. 6.

FIG. 6 illustrates a circuit simulation waveform 600, and FIG. 7 illustrates a graph representation 700, according to one or more examples. The circuit simulation waveform 600 includes signal 610 and signal 620. In one example, the signal 610 corresponds to a physical layer (PHY) update. For example, the signal 610 may correspond to a change in operating power mode (e.g., instructions to enter a low power mode), or an operating frequency, among others. The signal 620 corresponds to an acknowledgement signal that acknowledges that the signal 610 has been received and the corresponding action has been completed.

The graph representation 700 is generated by the graph generation engine 110 from the circuit simulation waveform 600. For example, based on the rising edge of the signal 610 at time $T_t$, the graph generation engine 110 generates the node 710. Further, based on the rising edge of the signal 620 at time $T_{t+n}$, the graph generation engine 110 generates the node 720. Further, as the signal 620 is generated in response to the signal 610, the graph generation engine 110 generates the branch (or connector) 730 connecting the node 710 with the node 720. In an example where the signal 620 does not include a rising edge (e.g., a pulse), the graph generation engine 110 does not generate the node 720 and the branch 730. In such a situation the node 710 is connected to a null. Accordingly, the node 710 is an empty node with a weight of 0.

In one example, 320 of the method 300 includes determining a nearest neighbor signal for another signal. For example, as illustrated in FIG. 4 and FIG. 5, the nodes 430 corresponding to signals 520 are associated with multiple commands. The graph generation engine 110 determines the signals (and nodes) associated with each of the commands. For example, for each signal 520, an associated acknowledgement, or additional command signal, is determined. In one example, the node $430_1$ and the node $430_N$ are associated with read command signals. Accordingly, each of the nodes $430_1$ and $430_N$ has a respective DQ signal, DQS signal, WCK signal, and CK signal, represented by nodes 440 and 450. However, the corresponding circuit simulation waveform (e.g., the circuit simulation waveform 500) includes multiple DQ signals, DQS signals, WCK signals, and CK signals. In such an example, the graph generation engine 110 determines which of the DQ signals, DQS signals, WCK signals, and CK signals are nearest neighbors of (e.g., associated with) each of the command signals 520, and creates a link within the graph representation 400. In one example, nearest neighbor for a command signal (e.g., the command signal 520) is a response signal (e.g., signals 530, 540, 550 and 560) having a rising edge or falling edge (e.g., transition) closest in time to the rising edge or falling edge of the command signal. For example, the signals 530, 540, 550 and 560, are determined to be nearest neighbors of the command signal $520_1$. Accordingly, the nodes 440 are connected to the node $430_1$. Further, the signals associated with the nodes 450 are determined to be a nearest neighbor with the command signal $520_N$ (e.g., the node $430_N$), and the nodes 450 are linked with the node $430_N$. In one or more examples, determining a nearest neighbor for a signal includes determining a latency between an edge of a second signal and the edge of the first signal. Further, latency between an edge of a third signal and the edge of the first signal is determined. The latencies are compared to each other to determine which latency is less than the other. The signal associated with the shorter latency is determined to be the nearest neighbor signal.

In one example, the nearest neighbor is determined based on the nodes connected via the branch associated with the lowest latency. For example, the latency between the node $430_1$ and 441 (e.g., latency between a first signal and second signal) is less than the latency between the node $430_1$ and the node 452 (e.g., the latency between the first signal and a third signal), accordingly, the node $430_1$ and the signal 530 are determined to be nearest neighbors for the node $430_1$ and the command signal $520_1$. Further, in one or more example, the shortest paths between a first node (e.g., the node $430_1$) and two or more other nodes may be determined using Dijkstra's algorithm. Dijkstra's algorithm may be used to find the shortest paths from a source node (e.g., the node $430_1$) of a graph representation and two or more other nodes of the graph representation. The shortest paths may be referred to as having the best latency threshold. In other examples, other algorithms may be used to determine the shortest paths between nodes of a graph representation.

In one or more examples, the nodes $430_1$ and 440 may be referred to as a command. A command is a group connected nodes that are grouped based on a determination of nearest neighbors.

With further reference to FIG. 3, at 330 of the method 300, a simulation property of the circuit design is determined from the graph representation. For example, the property engine 120 determines latency information, timing information, and assertion information, among others. The latency information corresponds to the timing information for connected nodes. The timing information corresponds to a timestamp at which a command (e.g., a group of interconnected nodes) occurs. In one example, the latency information is determined from the timing information and corresponds to a difference in time between when a signal is received (e.g., command signal) and each corresponding communication signal is initiated. Assertion information corresponds to a timestamp at which a signal is asserted or deasserted. In one example, the assertion information may be determined to be relevant or irrelevant depending on the nearest neighbor information. For example, for two signals (or nodes) determined to be nearest neighbors of each other, the assertion information is determined to be relevant. In an example where two signals (or nodes) determined to not be nearest neighbors of each other, the assertion information is determined to be irrelevant. The assertion information is represented by the weight value of the nodes.

In one example, with reference to FIGS. 4 and 5, times T1-T15 are each different timestamps within the circuit simulation waveform 500 at which values of the signals 510, 520, 530, 540, 550, and 560 are recorded. In one example, the difference in time between setting the node 430 to a value of 1 and setting each of the nodes 442, 444, 446, and 448 to a value of 1, corresponds to a latency. For example, the difference between T12 and T1 corresponds to the latency at node 442, the difference between T13 and T1 corresponds to the latency at node 444, the difference between T14 and T1 corresponds to the latency at node 446, and the difference between T15 and T1 corresponds to the latency at node 448. In one example, the property engine 120 determines the latency of each of the nodes 442, 444, 446, and 448. Further, the property engine 120 sets the latency of each node 442, 444, 446, and 448 as the value (e.g., weight) of each respective branch connecting the nodes 442, 444, 446, and 448, with the node $430_1$. Similarly, the latency of the nodes 430 and 440 are determined. Latency may correspond to one or more microseconds.

With reference to FIGS. 6 and 7, the property engine 120 determines that the node 720 is connected to the node 710 via the branch 730, and, accordingly, the signal 610 was received, and the corresponding action was completed based on the signal 620. In an example where the node 720 and branch 730 are omitted, e.g., the signal 620 does not include a rising edge (e.g., pulse), the property engine 120 determines that the node 710 is not connected to any other nodes, and the signal 610 was not received and the corresponding action was not completed.

In one or more examples, the circuit design system 100 outputs the simulation properties determined during 330 of the method 300. The simulation properties are output to the memory 130. In another example, the simulation properties are output to another engine within the circuit design system 100, a system external to and connected to the circuit design system, and/or to a display device. In one example, the simulation properties are output as a report in a tabular form. The simulation properties may be displayed within the GUI 140. For example, the report may be displayed the GUI 140.

In one example, outputting the simulation properties includes relating the simulation properties with each signal.

In one or more examples, the property engine 120 generates a hash map of the signals within the circuit simulation waveform based on the graph representation. For example, the property engine 120 creates one or more hash maps from the signals of the circuit simulation waveform (e.g., the circuit simulation waveform 500) based on the graph representation (e.g., the graph representation 400). The hash map relates each rising and/or falling edge of the signals of the circuit simulation waveform with a timestamp, includes the relationships (e.g., nearest neighbor) of the signals of the circuit simulation waveform, and includes the timing information of the signals.

In one example, the simulation properties are used to detect timing errors (e.g., commands that are too fast), lack of acknowledgement signals (e.g., PHY signal for a change in operating frequency or low power mode with no acknowledgement signal), and an incorrect operating frequency, among others.

In one or more examples, the method 300 generates multiple graph representations for a circuit simulation waveform. In one example, a different graph representation is generated for each different interface (e.g., DFI interface and JEDEC interface). The different graph representations are disjointed forest graphs. The graph representations may be joined or combined to form a master poly forest graph. For example, a first graph representation is generated based on the method 300 for a first one or more signals of the circuit simulation waveform 500, a second graph representation is generated based on the method 300 for a second one or more signals of the circuit simulation waveform 500.

In one example, while the method 300 of FIG. 3 is directed to analyze a single circuit simulation waveform, in other examples, the method 300 may be used to analyze multiple circuit simulation waveforms during at least partially overlapping periods of time. For examples, the graph representation is determined for two or more circuit simulation waveforms during at least partially overlapping periods in time. In one example, a simulation property for a first circuit simulation waveform and a graph representation of a second simulation waveform are determined during at least partially overlapping periods of time.

Figure 8:
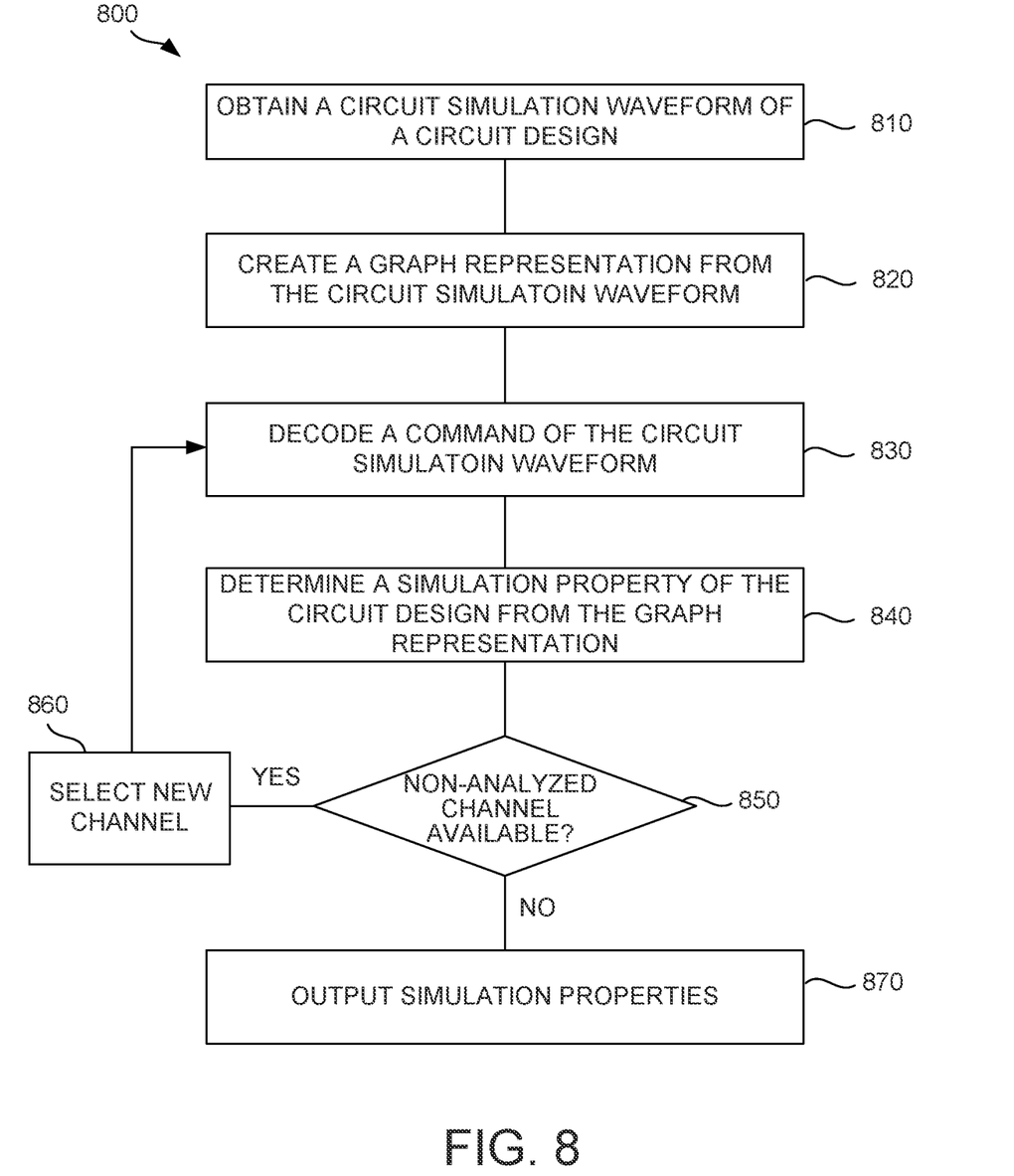
FIG. 8 depicts a flowchart of a method for determining simulation properties from a graph representation of a circuit simulation waveform, according to one or more examples.

FIG. 8 illustrate a flowchart of a method 800 for analyzing circuit design, according to one or more examples. In one example, the method 800 is performed by the circuit design system 100. For example, one or more processors of the circuit design system 100 execute instructions stored within a memory to perform the method 800. The method 800 includes obtaining a circuit simulation waveform of a circuit design at 810. 810 may correspond to 310 of the method 300. Further, the method 800 includes creating a graph representation from the circuit simulation waveform at 820. 820 may be similar to 320 of the method 300.

At 830, a command of the circuit simulation waveform is decoded. For example, with reference to FIGS. 4 and 5, the command, or commands, associated with the nodes 430 and the signal 520 is decoded. In one example, decoding the commands includes detecting the number and order of occurrence of logical 1's and 0's within one or more of the signals 520, and comparing the number and order of occurrence of logical 1's and 0's to a corresponding list of commands. The commands are stored within the memory 130. In one example, the property engine 120 of FIG. 1 determines that the weight of the node 410 is 1 (e.g., the signal 510 is asserted). Based on determining that the weight of the node 410 is one, the property engine 120 determines the values of the nodes 430 (e.g., the command signals 520) based on the node 410 having a weight value of 1. Further, based on the node 410 having a weight value of 1, the weight value of the nodes 430 are grouped to determine a combined value for each timestamp. For example, if the combined value is "1, 0, 0, 0, 0, 0, 0, 1", the command is determined to be a read command. The value of the nodes 410 is compared to a database of commands by the property engine 120 to determine the command and perform decoding. For example, the database may be stored within a memory (e.g., the memory 130). The database of commands is associated with an interface protocol. In other examples, the commands may include write commands, refresh commands, and acknowledge commands, among others.

Further, circuit simulation waveform (e.g., the circuit simulation waveform 132, 500) and the commands correspond to a communication interface, or interfaces, that is being used by the corresponding circuit design. The communication interface may be a DFI (double data rate (DDR) PHY interface) communication protocol or a JEDEC (Joint Electron Device Engineering Council) communication protocol.

At 840, a simulation property (e.g., latency information, timing information, assertion information, and command information, among others) of the circuit design is determined from the graph representation. 840 may correspond to 330 of the method 300. Further, the simulation property is determined as described above with regard to 330 of the method 300.

At 850, the present system determines whether a non-analyzed channel of a communication interface is available. For example, the circuit simulation waveform (e.g., the circuit simulation waveform 132 of FIG. 2 or the circuit simulation waveform 500 of FIG. 5) includes signals associated with one or more channels (e.g., channels 0 and 1). The graph generation engine 110 analyzes the circuit simulation waveform to determine if another channel exists. Based on the determination that another channel exists (e.g., channel 1), at 860, a new channel is selected (e.g., the channel 1 is selected), and 830-850 of the method are repeated based on the signals of the circuit simulation waveform associated with the newly selected channel. In one example, the signals associated with a first channel (e.g., channel 0) are analyzed during a first occurrence of the 830 and 840, and at 860 of the method 800, a second channel (e.g., channel 1) is selected and analyzed during a second occurrence of 830-840 of the method 800.

If at 850, a non-analyzed channel is not available, the simulation properties are output at 870. For example, in one or more examples, the circuit design system 100 outputs the simulation properties to the memory 130. In another example, the simulation properties are output to another engine within the circuit design system 100, a system external to and connected to the circuit design system, and/or to a display device. In one example, the simulation properties are output as a report in a tabular form. In one example, outputting the simulation properties includes relating the simulation properties with each signal. Further, in one or more examples, output the simulation properties includes displaying the simulation properties within a GUI (e.g., the GUI 140 of FIG. 1).

In one example, 850 of the method 800 may be omitted. For example, for a circuit design that does not include multiple channels, 850 of the method 800 may be omitted.

In one example, the method 800 is performed for each communication interface protocol (e.g., DFI or JEDEC). The method 800 may be performed in during at least partially overlapping periods for two or more communication interface protocols. In one example, the method 800 is performed on at least two of the communication interface protocols in parallel. In one example, a circuit simulation waveform may include signals associated with one or more communication protocol. Accordingly, for the signals associated with each communication protocol are analyzed based on the method 800 based on the corresponding communication protocol.

Figure 9:
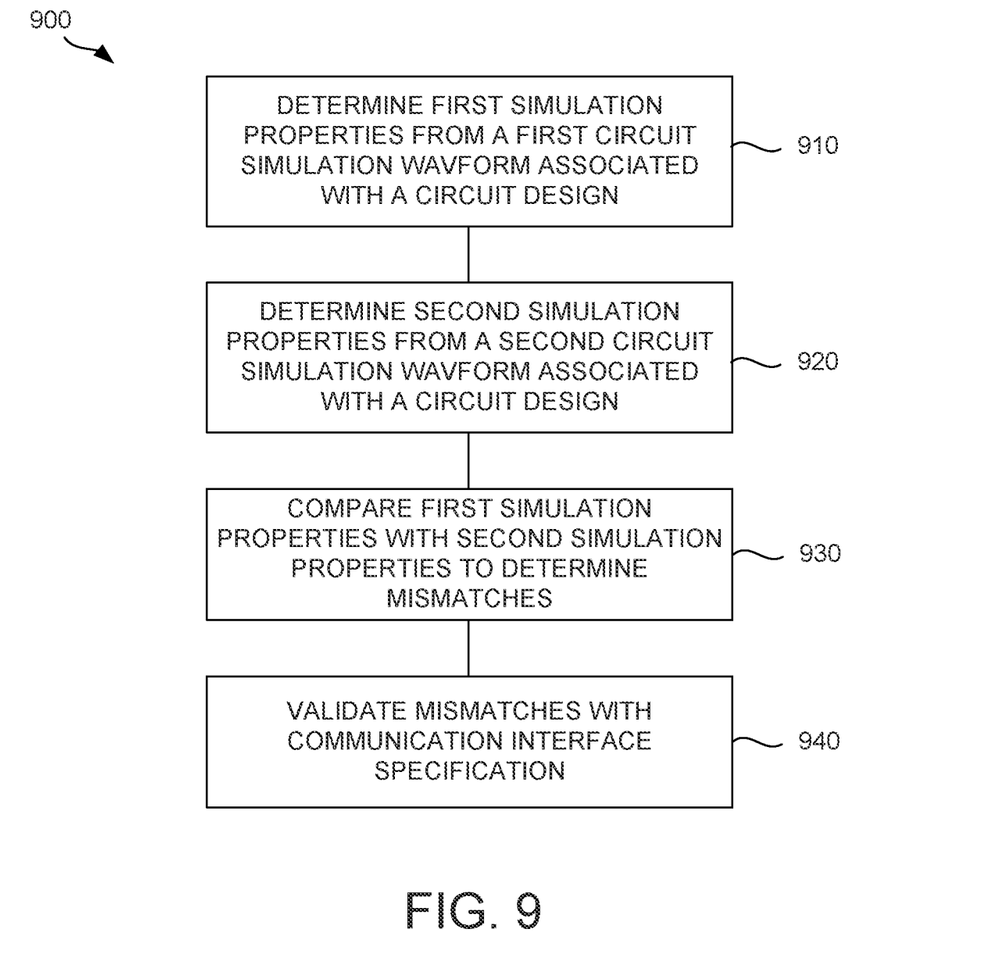
FIG. 9 depicts a flowchart of a method for detecting errors in a circuit simulation waveform, according to one or more examples.

FIG. 9 illustrates a flowchart of a method 900 for detecting errors in simulation properties, according to one or more examples. The method 900 is performed by the circuit design system 100. For example, one or more processors of the circuit design system 100 execute instructions stored within a memory to perform the method 900. The method 900 includes at 910, determining first simulation properties from a first circuit simulation waveform associated with a circuit design. The first circuit simulation waveform is obtained from a memory (e.g., the memory 130) or received from another system. For example, the circuit design system 100 determines the first simulation properties from the first circuit simulation waveform as described above with regard to FIG. 2.

At 920, second simulation properties from a second circuit simulation waveform associated with the circuit design (e.g., the same circuit design as used in 910 of the method 900). In one example, 920 includes generating, by the circuit design system 100, the second circuit simulation waveform from the circuit design using the same design parameters used to generate the first circuit simulation waveform. The second circuit simulation waveform is used by the circuit design system 100 to generate second simulation properties.

At 930, the first and second simulation properties are compared to determine mismatches. For example, the circuit design system 100 compares the first and second simulation properties to determine differences between the first and second simulation properties. In one example, the second simulation properties may be referred to as a "control," and can be used to detect erroneous settings used when generating the first circuit simulation waveform from the circuit design. For example, latency information of the first simulation properties is compared to latency information of the second simulation properties. A differences is determined between the latency information of the first simulation properties and the latency information of the second simulation properties that may be indicative of a timing error and/or incorrect timing setting within the settings used to generate the first simulation waveform of the circuit design.

At 940, the mismatches are validated with a communication interface specification. For example, the circuit design system 100 compares the mismatches to a communication interface (e.g., DFI or JEDEC) specification to determine whether or not the mismatches meet the specifications. Based on a determination that the mismatches do not meet the specification requirement(s), the mismatches are associated with errors. The errors may be saved within the memory 130 and/or output to another system or a display device. For example, the errors may be displayed within a graphical user interface within a display device. Based on a determination that the mismatches meet the specification, the mismatches are not associated with errors.

Figure 10:
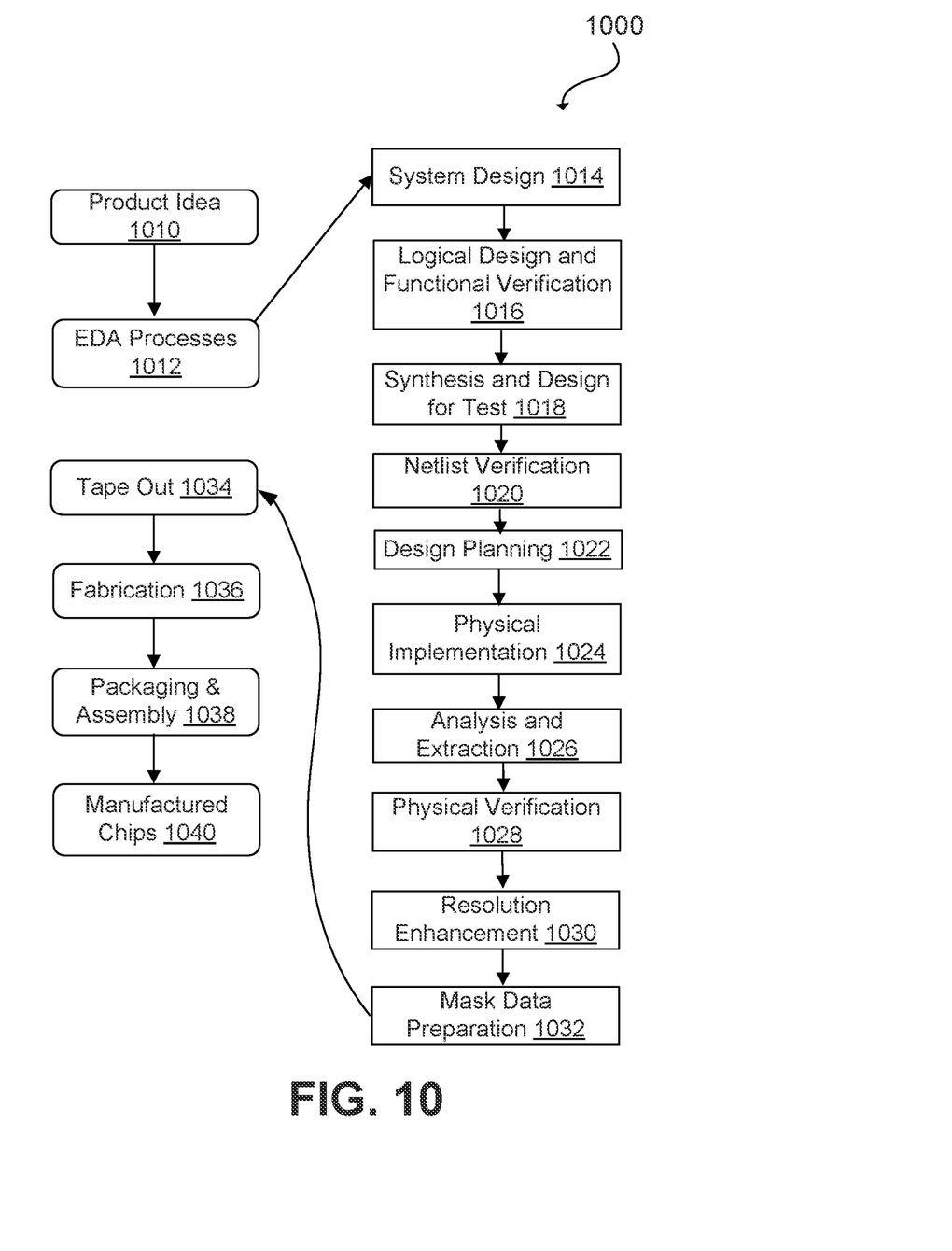
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where branch of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as design rule checking (DRC) constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits.

A storage subsystem of a computer system (such as computer system 1100 of FIG. 9) may be used to store the programs and data structures that are used by some or all of the EDA products described herein, and products used for development of cells for the library and for physical and logical design that use the library.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining a circuit simulation waveform of a circuit design, the circuit simulation waveform including signals associated with one or more of a read transaction and a write transaction of the circuit design;
   creating a first graph representation from a first signal and a second signal of the signals of the circuit simulation waveform, the first graph representation including a first node corresponding to an edge of the first signal, a second node corresponding to the second signal, and a branch connecting the first node and the second node;
   determining, via a processing device, a first simulation property of the circuit design from the first graph representation; and
   outputting the first simulation property.

2. The method of claim 1, wherein the first simulation property includes one or more of latency information, timing information, or assertion information.

3. The method of claim 1, wherein creating the first graph representation comprises decoding a command associated within the first signal.

4. The method of claim 1, wherein creating the first graph representation comprises generating the second node from the second signal of the signals of the circuit simulation waveform.

5. The method of claim 4, wherein creating the first graph representation further comprises generating the branch connecting the first node and the second node based on the first signal and the second signal.

6. The method of claim 5, wherein determining the first simulation property comprises determining a latency between the first signal and the second signal based on the first node and the second node, and wherein the latency is stored as a value of the branch.

7. The method of claim 1, wherein creating the first graph representation comprises determining a value of the first signal based on the edge of the first signal, and associating the value with the first node.

8. The method of claim 1, wherein creating the first graph representation further comprises determining a neighbor signal of the signals of the circuit simulation waveform for the first signal, and associating the neighbor signal with the first signal.

9. The method of claim 8, wherein determining the neighbor signal comprises:
   determining a first latency between an edge of the second signal of the signals and the edge of the first signal, and a second latency between an edge of a third signal of the signals and the edge of the first signal; and
   determining that the second signal is the neighbor signal based on the first latency being less than the second latency.

10. The method of claim 1 further comprises creating a second graph representation from a third signal of the signals of the circuit simulation waveform, the third signal corresponds to a node of the second graph representation.

11. A system comprising:
   a memory storing instructions; and
   a processor, coupled with the memory to execute the instructions, the instructions when executed cause the processor to:
      obtain a circuit simulation waveform of a circuit design, the circuit simulation waveform including signals associated with one or more of a read transaction and a write transaction of the circuit design;

create a first graph representation from a first signal and a second signal of the signals of the circuit simulation waveform, the first graph representation including a first node corresponding to the first signal, a second node corresponding to the second signal, and a branch connecting the first node and the second node;

determine a first simulation property of the circuit design from the first graph representation; and output the first simulation property.

12. The system of claim 11, wherein the first simulation property includes one or more of latency information, timing information, or assertion information.

13. The system of claim 11, wherein creating the first graph representation comprises decoding a command associated within the first signal.

14. The system of claim 11, wherein creating the first graph representation comprises:

generating the second node from the second signal of the signals of the circuit simulation waveform; and generating the branch connecting the first node and the second node based on the first signal and the second signal.

15. The system of claim 14, wherein determining the first simulation property comprises determining a latency between the first signal and the second signal, and wherein the latency is stored as a value of the branch.

16. The system of claim 11, wherein creating the first graph representation further comprises determining a neighbor signal of the signals of the circuit simulation waveform for the first signal, and associating the neighbor signal with the first signal.

17. The system of claim 16, wherein determining the neighbor signal comprises:

determining a first latency between an edge of the second signal of the signals and the edge of the first signal, and a second latency between an edge of a third signal of the signals and the edge of the first signal; and determining that the second signal is the neighbor signal based on the first latency being less than the second latency.

18. A non-transitory computer readable medium comprising stored instructions, which when executed by a processor, cause the processor to:

obtain a circuit simulation waveform of a circuit design, the circuit simulation waveform including signals associated with one or more of a read transaction and a write transaction of the circuit design;

detect a first signal of the signals and a second signal of the signals; and display, within a graphical user interface, a first graph representation including a first node, a second node, and a branch, the first node is generated based on the first signal and the second node is generated based on the second signal, and the branch connects the first node and the second node.

19. The non-transitory computer readable medium of claim 18, wherein the processor is configured to:

display, within the graphical user interface, one or more simulation properties of the circuit design determined from the first graph representation.

20. The non-transitory computer readable medium of claim 18, wherein the processor is configured to:

determine a first latency between an edge of the second signal and an edge of the first signal, and a second latency between an edge of a third signal of the signals and the edge of the first signal; and determining that the second signal is a neighbor signal based on the first latency being less than the second latency.

* * * * *